United States Patent
Rabe et al.

(10) Patent No.: US 7,415,602 B2
(45) Date of Patent: Aug. 19, 2008

(54) APPARATUS AND METHOD FOR PROCESSING A SEQUENCE OF JUMP INSTRUCTIONS

(75) Inventors: Dirk Rabe, Munich (DE); Holger Sedlak, Lochhofen (DE)

(73) Assignee: Infineon Technologies AG, Munich (DE)

( * ) Notice: Subject to any disclaimer, the term of this patent is extended or adjusted under 35 U.S.C. 154(b) by 221 days.

(21) Appl. No.: 11/017,209

(22) Filed: Dec. 20, 2004

(65) Prior Publication Data

US 2005/0154868 A1     Jul. 14, 2005

Related U.S. Application Data

(63) Continuation of application No. PCT/EP03/06625, filed on Jun. 24, 2003.

(30) Foreign Application Priority Data

Jun. 24, 2002   (DE)   ................................ 102 28 151

(51) Int. Cl.
*G06F 9/42* (2006.01)
*G06F 9/44* (2006.01)
*G06F 12/10* (2006.01)

(52) U.S. Cl. .................. 712/234; 712/202; 712/245
(58) Field of Classification Search ................. 712/234, 712/245, 202
See application file for complete search history.

(56) References Cited

U.S. PATENT DOCUMENTS 4,432,051 A * 2/1984 Bogaert et al. .............. 717/127
5,220,669 A * 6/1993 Baum et al. ................. 718/108
5,261,101 A    11/1993 Fenwick
5,737,590 A * 4/1998 Hara .......................... 712/238
6,055,617 A * 4/2000 Kingsbury ................... 711/203

FOREIGN PATENT DOCUMENTS

EP      0 649 084 A1    4/1995

OTHER PUBLICATIONS

"Return Address Stack Cache," IBM Technical Disclosure Bulletin, vol. 34, No. 11, Apr. 1992, pp. 269-271.

* cited by examiner

*Primary Examiner*—Daniel Pan
(74) *Attorney, Agent, or Firm*—Slater & Matsil, L.L.P.

(57) ABSTRACT

An apparatus for processing a sequence of instructions, which comprises a LCALL instruction, a FCALL instruction and a common re-jump instruction (return), comprises a means for reading-in an instruction, to perform the read-in instruction of a means for examining the instruction. In the case of the presence of LCALL or FCALL, a stack memory is filled, while the stack is emptied in the case of the presence of a re-jump instruction. At every re-jump, a predetermined amount of re-jump information is taken from stack and supplied to a means for decoding, which is formed to access the stack again in the case where the predetermined amount of re-jump information indicates a change of the physical memory window, to finally supply the correct address for the next instruction in the instruction sequence to the means for reading in. Thereby, the same re-jump instruction can be used for a call with FCALL (outside of a current physical memory window) and a call with LCALL (within the physical memory window), without a microprocessor change, by encoding the re-jump information on the stack and by decoding them by the means for decoding. Thereby, the re-jump instruction provided for the microprocessor can be used for both jump instructions.

20 Claims, 9 Drawing Sheets

FIG 1

FIG 2A      (jump with LCALL)

FIG 2B      (jump with FCALL)

FIG 3    (re-jump for LCALL/FCALL)

| jump instruction | Source | Target | re-jump information on stack |
|---|---|---|---|
| LCALL | NICHT-FS | NICHT-FS | 2 Bytes |
| LCALL | FS | NICHT-FS | 2 Bytes |
| LCALL | NICHT-FS | FS | 2 Bytes |
| LCALL | FS | FS | 2 Bytes |
| FCALL | NICHT-FS | FS | 4 Bytes |
| FCALL | FS | FS | 4 Bytes | indication by FAR-RETURN-INDICATOR (embodiment A)

FIG 4

| jump instruction | Source | Target | re-jump information on stack | |
|---|---|---|---|---|
| LCALL | NICHT-FS | NICHT-FS | 2 Bytes | 50 |
| LCALL | FS | NICHT-FS | 3 Bytes | 51 |
| LCALL | NICHT-FS | FS | 2 Bytes | 52 |
| LCALL | FS | FS | 3 Bytes | 53 |
| FCALL | NICHT-FS | FS | 4 Bytes | 56 |
| FCALL | FS | FS | 3 Bytes | 57 | indication by -FAR-SEGMENT (FS)
-FAR-RETURN-INDICATOR

FIG 5 (embodiment B)

APPARATUS AND METHOD FOR PROCESSING A SEQUENCE OF JUMP INSTRUCTIONS

CROSS-REFERENCE TO RELATED APPLICATION

This application is a continuation of International Application No. PCT/EP03/06625, filed Jun. 24, 2003, which designated the United States and was not published in English, and which is based on German Application No. 102 28 151.3, filed Jun. 24, 2002, both of which applications are incorporated herein by reference.

BACKGROUND OF THE INVENTION

1. Field of the Invention

The present invention relates to microprocessors and particularly to microprocessors with a fixedly preset logical address space.

2. Description of the related art

Although the development of microprocessors and microcontrollers, respectively, has lead to significant performance increases, older CPU architectures are still given preference to later architectures in the integration of a CPU in an integrated circuit in certain technical fields of applications, such as in the chip card area or in SOC designs. One reason therefore is that later CPU architectures with a higher performance are often over dimensioned for the respective intended field of application and thus require too much power with regard to the tasks to be performed and take up too much chip area. Another reason to give preference to an older CPU architecture to a newer, more powerful one is that the software development environment for the older CPU architectures, such as the 8051 or 8052 based microcontroller architecture is often more popular with customers and more software designers are available for them.

The problem of the software development environment for older controller architectures, which is more popular with customers, is particularly significant in the chip card area, since here the development of the machine programs processable on the chip card and the executable machine code, respectively, lies not within the responsibility of the chip manufacturer but in the responsibility of the big customers, such as banks and their software development companies as well as the respective operating system development company. Further, due to the high required part number, it is of great significance for the chip card customers to use chip card controllers, which are adapted to the respective requirements to keep the costs as low as possible. Accordingly, in order to satisfy the low-end chip card area as well as to fulfill the wish of some customers for known software development environments, the chip card manufacturer has to be able to provide chip cards, which are based on an older microcontroller architecture.

One problem in using older controller architectures in the chip card production is, however, that their addressing possibilities are not sufficient. Thus, the performance of an 8051 based CPU generally is sufficient in the chip card area to take on the management tasks of a chip card, but due to the high security requirements, cryptography algorithms, which comprise calculating operations with regard to very high operands, have to be processed by cryptoprocessors on the chip card. In the known RSA (Rivest, Shamir and Adleman) algorithm, for example, operand lengths of 1024 are common. Due to these high operand lengths to be processed, as well as the complexity of the cryptoalgorithms themselves, the access to a memory as large as possible is required in chip cards. The problem with using CPUs, which are based on older controller architectures, is that they only allow the addressing of merely small memory sizes. 8051-based CPUs, for example, allow merely the addressing of 64 kBytes.

A possible approach to make a large memory addressable despite the usage of a controller of an older architecture, is to use externally stored descriptors and base addresses, respectively, which determine the position of a memory window to be addressed by the CPU, so that the memory area addressable by the CPU can be shifted over the whole larger memory via the memory window.

To explain the differentiation between a logical address space and a physical address space in more detail, reference will be made to FIG. 6A. In the embodiment shown in FIG. 6A the physical address space extends from an address "00000" to an address "FFFFF". Thus, the physical address space comprises 1 MByte. It should be noted that a physical memory has to be present not necessarily for every physical address of the physical address space. Rather, the great number of physical address will not refer to a physical memory cell. Particularly in chip cards, one is currently far from providing 1 MByte. Typical sizes for present chip cards comprise 64 kBytes as EEPROM, 4 kBytes as XRAM and 136 kbytes as ROM. However, the flexibility requires designing the physical address space larger to enable a further upgrade of memory chips, depending on requirements and technical development.

Known and fully developed microcontroller architectures based on the 8051 standard support the access to a total of 64 kbyte data and 64 kByte code efficiently. Thus, the logical address space of the microcontroller comprises merely 64 kBytes as it is illustrated on the left in FIG. 6A. In the basic 8051 architecture, the access to larger memory areas (data and code) by known concepts is slow with regard to the required block cycles, and complex and expensive in programming, since additional management codes are required.

For simplifying the access to a larger physical address space, a memory management unit (MMU) was introduced, with the help of which the 64 kByte address space, which is also referred to as logical address space, is remapped to a physical address space of 1 MB. This remapping, however, does not lead to an increase of the logical 64 kByte address space, but that at a certain time still 64 kBytes of a physical address are visible, but that the actually visible 64 kByte address can be changed. Therefore, the MMU is reconfigured by using a descriptor. The descriptor identifies a certain physical memory area, which is 64 kBytes in size and contiguous in the example shown in FIG. 6A. The descriptor is, for example, the lowest address of the visible physical memory area, wherein then the current physical address can be determined by the basic address known by the descriptor and the logical address as "offset".

For addressing a logical address space with a size of 64 kBytes, addresses with a length of 16 bits, which means 2 bytes, are required.

For addressing a physical address space of 1 MByte, however, physical addresses with a length of 20 bits are required. Since for the identification of different physical memory windows with a length of 64 kBytes, the physical base addresses are merely required in a raster of 64 kbytes, a descriptor with a length of eight bit, which means one byte, is more than sufficient to address all physical memory windows with a size of 64 kbyte. It should be noted that not necessarily the top 8 bits of the physical base address have to be taken as descriptor, but that a table can be stored in a MMU, which contains a descriptor as input information, and outputs, for example, the top 8 bits of the physical base address or the physical base address in full length as output information.

Figure 6A:
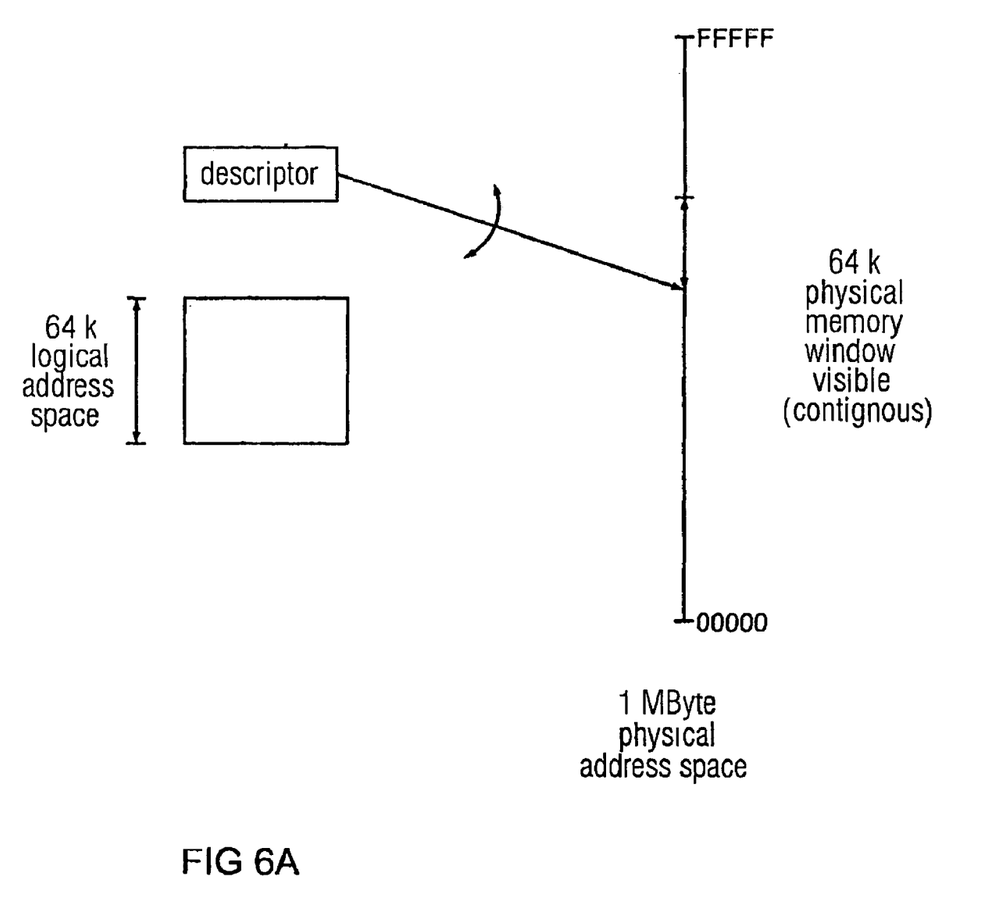
FIG. 6A is a schematic representation of a contiguous physical memory window.

Often, it is not favorable to have a physically contiguous memory area, as is illustrated in FIG. 6A, for certain requirements, such as in chip cards. Instead, it can be much more favorable for certain requirements to see, for example, 16 kBytes of the ROM, 16 kbytes XRAM and 32 kBytes in the EEPROM, but at different positions in the EEPROM.

Figure 6B:
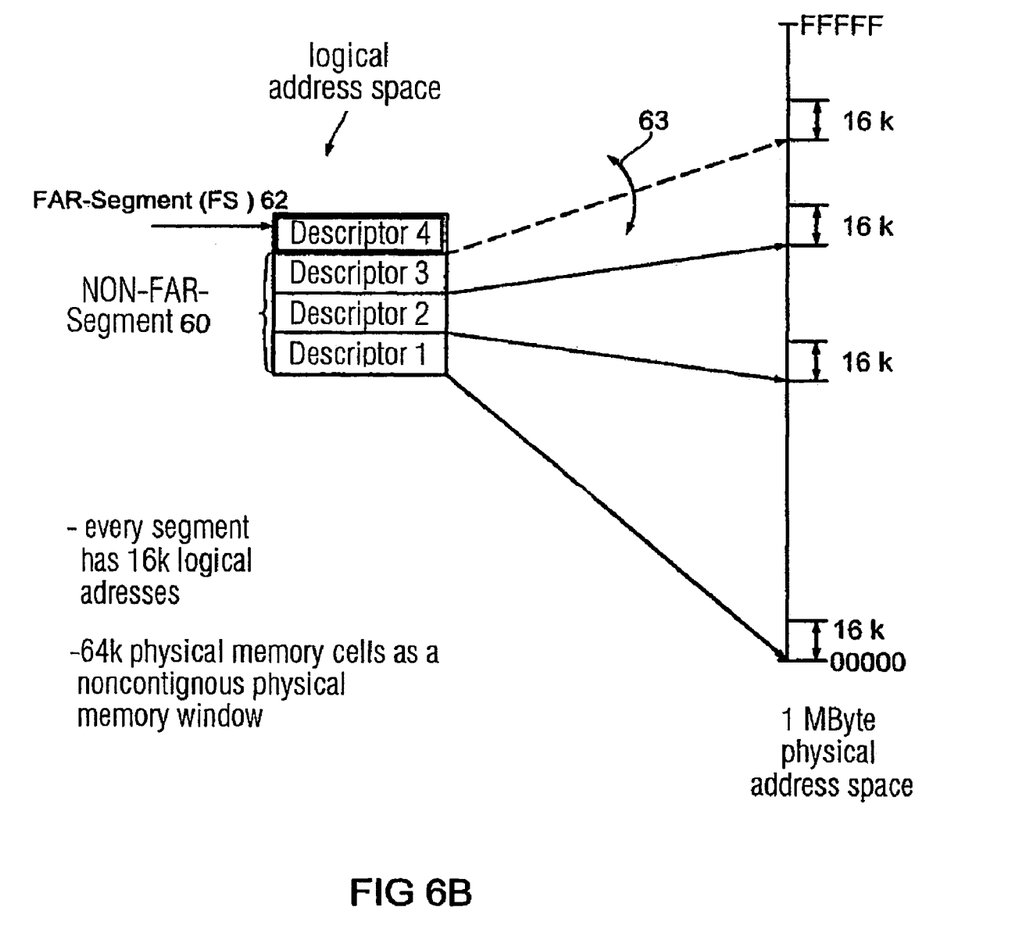
FIG. 6B is a schematic representation of a non-contiguous physical memory window.

For that reason, as it is shown in FIG. 6B, the logical address space is divided in, for example, four logical address segments, wherein one descriptor is associated to every address segment, such as descriptor 1, descriptor 2, descriptor 3, descriptor 4. A logical address in the lowest segment is converted into a physical address, which is on the right hand side in the 16 kByte area in FIG. 6B, by the memory management unit by using the descriptor 1.

A logical address in the logical address space, to which the descriptor 2 is associated, is converted in a respective physical address in the 16 kbyte window of the physical address space. Analogous to that, the logical address in the third segment, to which descriptor 3 is associated, is treated.

Further, in FIG. 6B a fourth segment of the logical address space is marked, which is also referred to as a Far segment FS. As well as to the other three segments, a descriptor (descriptor 4) is associated to the Far segment. If a logical address is present in the Far segment, the physical address associated to it is determined by using the descriptor 4, which is also referred to as Far descriptor, and the logical address in the Far segment. In the example shown herein, as agreed, the descriptors 1 to 3 are set to fixedly preset values, while merely the descriptor 4 is variable, as it is illustrated by an arrow in FIG. 6B. If a sequence of instructions, which is processed by the microprocessor, requires that a memory space is accessed, which is not within the four windows illustrated in FIG. 6B with a respective size of 16 kbytes, a logical address has to be generated in the Far segment (FS) together with a changed descriptor 4, by which a MMU is reconfigured, so that the part of the physical memory, where the currently required construction is, becomes visible.

In the following, reference will be made to FIG. 1, to illustrate the processes in a jump to a sub-program and a re-jump from the sub-program in more detail.

Figure 1:
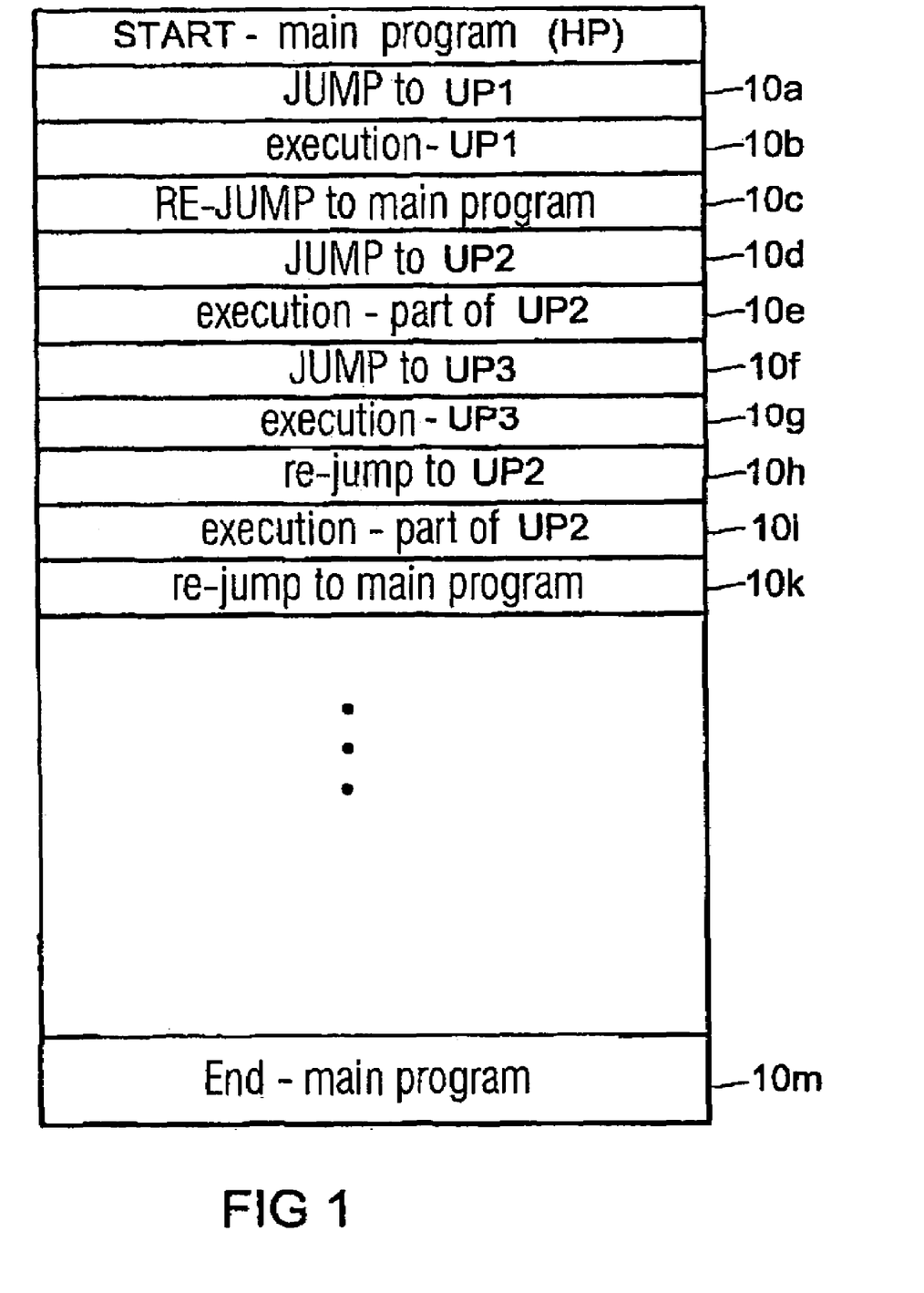
FIG. 1 is an exemplary sequence of instructions.

FIG. 1 shows an instruction sequence 10, which, for example, comprises a main program (HP) and three sub-programs (UP1, UP2 and UP3).

First, the main program is started. Thereupon, a sequence of instructions of the main program is processed, until an instruction 10a is met. The instruction is jump to sub-program 1 (UP1). The jump is performed to then perform the sub-program (UP1) as illustrated in FIG. 10b. At the end of the sub-program (UP1), as illustrated in FIG. 10c, a re-jump to the main program is made again. Thereupon, the main program is again processed, until an instruction 10d is reached, which says "jump to sub-program 2 (UP2)". Here, an interleaving is present, in such that first, as illustrated at 10e, part of the sub-program UP2 is processed, that then after processing the part a jump is made to another sub-program UP3 (10f). Then, the sub-program UP3 is performed completely (10g), and a re-jump is made to the sub-program UP2 (10h). Thereupon, another part of the sub-program UP2 is performed, namely the remaining part of it (10i), to re-jump then to main program (10k). Thereupon, further instruction sequences and instruction sub-sequences (sub-programs) are performed, until, finally, the end of the main program (10m) is reached.

No further problems will occur when both the main program and all sub-programs are within the contiguous physical memory window of FIG. 6A or in the non-contiguous physical memory window of FIG. 6B. The call of a sub-program can then be handled with an instruction LCALL (logical address), in such if a CPU, meets, for example, the instruction 10a, takes the argument of the instruction LCALL, which means the logical address of the logical address space, passes it on to the MMU, whereupon the MMU determines the respective physical address by using the descriptor associated to the contiguous logical address space (case of FIG. 6A) or by using the descriptor associated to the logical address segment, wherein the logical address is (case of FIG. 6B). From this physical address, the next instruction in the sequence, which will then be the first instruction of the sub-program, is fetched and performed.

In order for the CPU to continue after the performance of the sub-program in the main program again, which means after a re-jump instruction (10c of FIG. 1), re-jump information is stored. In this case, the re-jump information is the logical addresses, where the next instruction of the main program to be performed is.

Analogous to that, nested sub-programs (row 10d to 10k of FIG. 1) are performed.

If there is not the situation that all sub-programs are stored within the currently visible physical memory window, a call instruction FCALL (physical address) is used. The physical address in the instruction FCALL is expressed by a logical address and a descriptor. If the MMU receives the instruction FCALL and interprets information coming from the CPU as an instruction FCALL, respectively, the MMU is reconfigured by using the obtained descriptor, to retrieve and perform an instruction of the sub-program, such as the sub-program 2 of FIG. 1, from the physical address, which is now within the memory window, by the altered descriptor.

For ensuring a correct re-jump after performing the sub-program UP2, a reconfiguration of the MMU has to be performed again, since the instructions of the main program are within a memory window, which, with high probability, does not coincide with the memory window where the sub-program UP2 is visible. When performing sub-programs in unmapped memory areas, the MMU first has to be configured for the desired address area and after ending, which means after a re-jump instruction or "return", it has to be restored again. This restoring of the MMU is currently solved within a current compiler/linker solution by a so-called banking concept, which provides a code for setting and resetting for every possible memory bank, i.e., for every possible physical address area of FIG. 6A or FIG. 6B. This concept costs additional code memory in the constantly visible memory and is expensive and complicated.

In the re-jump of a sub-program jumped to by FCALL, the MMU descriptor of the Far segment has to be restored. One possibility for the realization of these different return mechanisms is the usage of two different return instructions, e.g., Ret for LCALL and FRet for FCALL. A return instruction (Ret) is a simple re-jump, which does not require any descriptor change, while the other return instruction is a Far return instruction, where the MMU has to be reconfigured to the old descriptor, which means the descriptor "from which" an original jump has taken place.

A disadvantage of this concept is particularly the usage of two different return instructions, since these instructions require interventions into the sub-programs. Typically, every sub-program is terminated with a return instruction. Sub-programs, however, exist already as preconstructed software components, which are only reluctantly intervened in, or which cannot be intervened at all, for example when the chip card manufacturer would be required to do so. For security reasons, it is often the case that the chip card manufacturer merely provides the hardware with specification, and that the actual sub-programs, such as cryptographical programs, etc., are developed by the user and loaded to the chip card. In other words, this means that often, particularly in security relevant applications, the chip card manufacturer himself has no access to the sub-programs or is not supposed to have access, to modify, for example the return instructions of the individual sub-programs from case to case into Far return instructions or simple return instructions.

An additional reason for using a return instruction for both options is that a software program can be jumped to both with FCALL and with LCALL (depending on current visibility).

Thus, such a procedure would, if it is possible at all, lead to increased effort (costs) and accompanying increased error-liability.

SUMMARY OF THE INVENTION

It is the object of the present invention to provide a simple concept for processing a sequence of instructions.

In accordance with a first aspect, the present invention provides an apparatus for processing a sequence of instructions, which are stored at different memory addresses in a physical address space, wherein the apparatus is formed to address a logical address space by a predetermined number of logical addresses, and wherein the physical address space is larger than the logical address space, wherein a jump instruction comprises a physical address to address an instruction, which is positioned outside of a physical memory window defined by the logical address space, and wherein a re-jump instruction is provided to terminate a sub-sequence of instructions started by the jump instruction, having: means for reading in an instruction of the sequence of instructions; means for examining the instruction, wherein the means for examining is formed to determine and store re-jump information in the case of the presence of the jump instruction, which refer to the presently current physical memory window, and to retrieve a predetermined amount of the stored re-jump information in the case of a re-jump instruction; and means for decoding the predetermined amount of stored re-jump information to determine whether the predetermined amount comprises a reference to a physical address outside of a current physical memory window, to activate the means for examining in such a case, to retrieve another amount of the stored re-jump information to identify the physical address outside of a current physical memory window for a re-jump.

In accordance with a second aspect, the present invention provides a method for processing a sequence of instructions, which are stored at different memory addresses in a physical address space, wherein the apparatus is formed to address a logical address space by a predetermined number of logical addresses, and wherein the physical address space is larger than the logical address space, wherein a jump instruction comprises a physical address to address an instruction, which is positioned outside of a physical memory window defined by the logical address space, and wherein a re-jump instruction is provided, to terminate a sub-sequence of instructions started by the jump instruction, including the steps of: reading-in an instruction of the sequence of instructions; examining the instruction, wherein the means for examining is formed to determine and store re-jump information in the case of the presence of a jump instruction, which refers to a presently current physical memory window, to retrieve a predetermined amount of the stored re-jump information in the case of a re-jump instruction; and decoding the predetermined amount of the stored re-jump information, to determine whether the predetermined amount comprises a reference to a physical address outside of a current physical memory window, to activate the means for examining in such a case, to retrieve a further amount of the stored re-jump information to identify the physical address outside of a current physical memory window for a re-jump.

The present invention is based on the knowledge that using a single return instruction both for a first jump instruction without descriptor change (LCALL) and also for a second jump instruction with descriptor changes (FCALL) is enabled by determining and storing different re-jump information depending on the jump instruction.

In a re-jump, according to standard, a preset amount of re-jump information is typically taken a stack memory or from a stack of a processor and decoded in order to determine, whether in the jump, to which the examined re-jump belongs, a descriptor change has been performed or not. If it has been found out in decoding that no descriptor change has taken place, a preset amount of re-jump information is interpreted as simple logical re-jump address.

If, however, it has been determined that the current re-jump was preceded by a jump with descriptor change, another amount of re-jump information is fetched to determine the respective re-jump descriptor, such that the correct physical address of an instruction is found, which is part of the sub-program or main program, which is the target of the re-jump.

In a first preferred embodiment of the present invention, a predetermined amount of re-jump information, such as two bytes, is stored for every jump without descriptor change, independent of the fact from which logical segment into which logical segment a jump is made, wherein these two bytes represent the logical address, by which it can be continued in the target program of the re-jump.

In the case of a jump instruction with descriptor change, always another amount of re-jump information, such as further two bytes, is stored apart from the preset amount of re-jump information, independent of the fact from which segment into which segment a jump is made. The four byte total re-jump information comprise a window change indicator or Far return indicator of, for example, one byte, the descriptor for the re-jump target as well as a logical address.

This embodiment is advantageous in that in jumps within the memory window still merely a stack consumption of two bytes occurs.

In a second embodiment of the present invention, the jump instruction decoding is performed based on the logical address, which corresponds to the preset amount of re-jump information and is fetched in a re-jump instruction according to standard. If this logical address is a logical address in the Far segment (FS), further re-jump information is fetched. For jump instructions from the Far segment of the logical address space, merely three bytes of re-jump information are required, which means one byte less than in the first embodiment. For a jump instruction with the Far segment as target and with the instruction FCALL, however, four bytes are required, which comprise a Far return indicator, i.e., a window change indicator. Since the window change indicator is contained in the preset amount of re-jump information, a correct calculation of the physical address of the next instruction to be read-in can be performed by using a single return instruction.

The present invention is advantageous in that, independent of the fact whether an instruction without descriptor change (LCALL) or an instruction with descriptor change (FCALL) is used, it can be operated with one and the same return instruction. The differentiation, how much re-jump information is required to either remain in the same physical memory window or to perform a restore to a memory window present prior to the re-jump, is performed merely by decoding the re-jump information itself, which means the stack content, which is carried out as first-in-first-out-memory as usual.

Thus, no extensive, error-liable and complicated revisions of the sub-programs are required either in the compiler/linker or the source code itself are required, so that already existing sub-programs can be used without modification.

BRIEF DESCRIPTION OF THE DRAWINGS

These and other objects and features of the present invention will become clear from the following description taken in conjunction with the accompanying drawings, in which.

The following list of reference symbols can be used in conjunction with the figures:
10 instruction sequence
10a jump sub-program 1
10b performance of the sub-program 1
10c re-jump to main program
10d jump to sub-program 2
10e performance of part of the sub-program 2
10f jump to sub-program 3
10g performance of sub-program 3
10h re-jump to sub-program 2
10i performance of part of the sub-program 2
10k re-jump to main program
10l further instructions
10n end of the main program
20 read in instruction
21 instruction is LCALL
22 put re-jump information on the stack
23 accessing a physical address in the same physical memory window
24 read in instruction
25 instruction is FCALL
26 put re-jump information on the stack
27 access physical address in another memory window stack access
30 read in instruction
31 instruction is return
32 get re-jump information from stack
33 decode base information
34 decode and access again
35 decode and no renewed accessing
40 to 44 LCALL embodiment A
47 to 48 FCALL embodiment A
50 to 53 LCALL embodiment B
56 to 57 FCALL embodiment B
60 non-Far segment
62 Far segment
63 descriptor pointer
70 sequence of instructions
71 means for reading-in
71a line for logical address
71b line for physical address
72 means for examining
72a instruction is LCALL, FCALL
72b instruction is return
73 means for decoding
74 memory for re-jump information
75a fill memory
75b empty memory
76 control line for activating a renewed stack access
80 4 byte re-jump information
81 2 byte re-jump information (base information)
83 3 byte re-jump information

DESCRIPTION OF THE PREFERRED EMBODIMENTS

Figure 7:
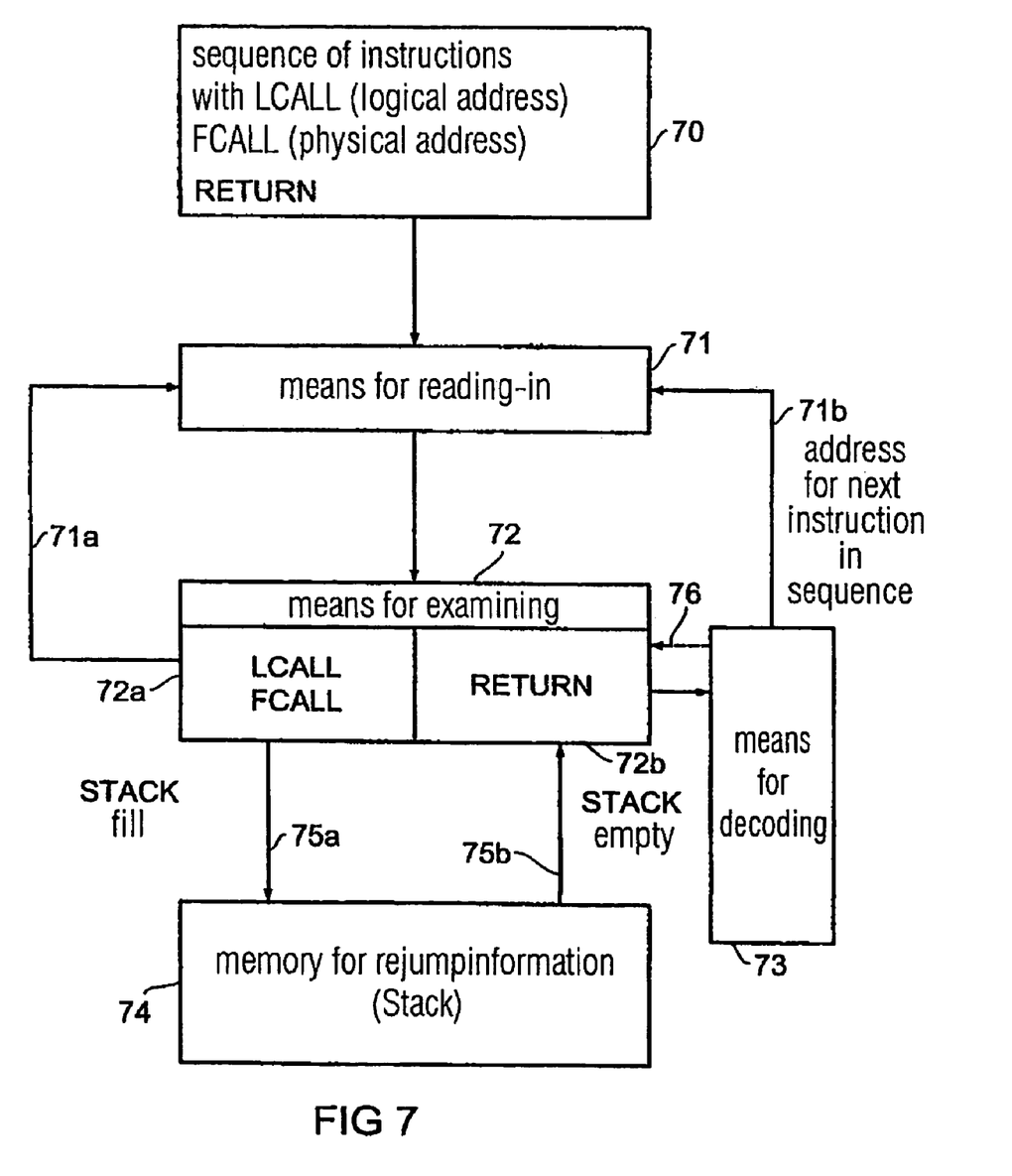
FIG. 7 is a block diagram of the inventive apparatus for processing a sequence of instructions.

FIG. 7 shows an inventive apparatus for processing a sequence of instructions, such as it can be implemented in a microprocessor. A sequence of instructions 70 comprises instructions, which are stored at different memory addresses in a physical address space. Particularly, the logical address space is addressable by a predetermined number of logical addresses, wherein the physical address space is larger than the logical address space. Further, the sequence 70 of instructions comprises a first jump instruction (LCALL), which comprises information about a logical address, to address an instruction, which is positioned in a physical memory window defined by the logical address space. Further, a second jump instruction (FCALL) is provided, which comprises information about a physical address, to address an instruction, which is positioned outside of a physical memory window defined by the logical address space. Further, a common re-jump instruction (return) is provided, to terminate a sub-sequence of instructions (UP1, UP2, UP3), started by the first or second jump instructions. The inventive apparatus comprises means 71 for reading in an instruction of the instruction sequence (70). The read in instruction is fed to means 72 for examining the instruction. Means 72 is formed to perform a differentiation whether a first or a second jump instruction is present (72a), or whether a re-jump instruction is present (72b). If means 72 determines that a first jump instruction (LCALL) is present, it is formed to determine and store first re-jump information, which relate to a presently current logical address space. If, however, means 72 for examining determines that a second jump instruction (FCALL) is present, it is formed to determine and store second re-jump information, which refers to a presently current physical memory window. If, however, the means 72 for examining determines that the read-in instruction is a re-jump instruction (72b), means 73 for decoding is activated to determine an address for the next instruction in the sequence and to supply it to a means 71.

As it is shown in FIG. 7, a memory 74 for re-jump information is provided in a preferred embodiment of the present invention. Among the experts, the memory is referred to as "stack". In the case of the presence of a jump instruction (72a), the means 72 for examining is formed to fill the stack 74 (75a), or in the case of the presence of re-jump information (72b), to empty the stack (75b).

Particularly, the means (72) for examining is formed to retrieve a predetermined amount, such as two bytes of the stored re-jump information in the case of the presence of a re-jump instruction (72b). The retrieved predetermined amount of re-jump information is fed to means 73 for decoding, so that it determines whether the predetermined amount of re-jump information references to a logical address in the current physical memory window, or whether the predetermined amount comprises a reference to a physical address outside of a current physical memory window. In the latter case, the means 73 for decoding is formed to activate the means 72 for examining again, as it is indicated by a control line 76 in FIG. 7, so that it retrieves another amount of stored re-jump information from the stack 74, to identify the physical address outside of a current physical memory window.

Figure 2A:
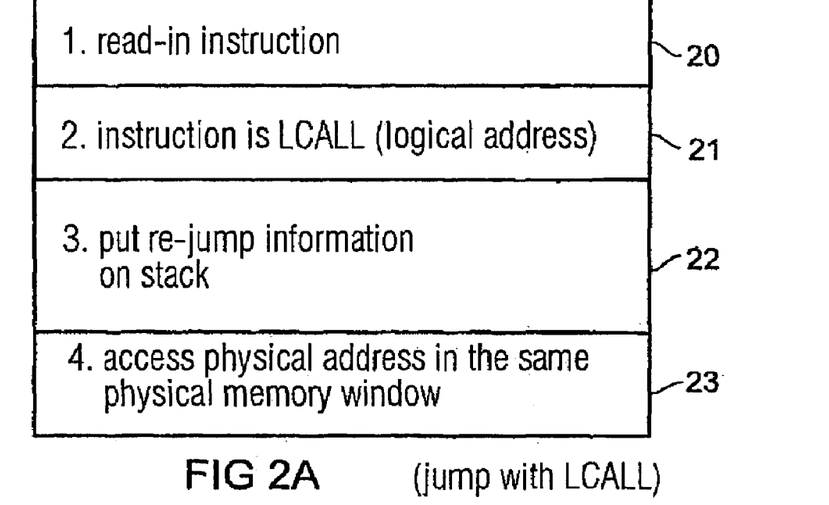
FIG. 2A is a flow sequence at a jump with LCALL.

Before the design of the means 72 for examining is discussed in more detail, so that it fills the memory with re-jump information (75a) or empties the memory by reading-in the re-jump information (75b), first, the step sequence is illustrated with reference to FIGS. 2A and 2B, which occurs when a microprocessor reads-in an instruction, until it finally accesses a physical address.

First, means 71 of FIG. 7 is active to read in an instruction (20). Thereupon, the means 72 of FIG. 7 determines that the instruction is the first jump instruction LCALL, which has as argument the logical address, where—with reference to the current memory window—the next instruction is stored (21) in the instruction sequence. Further, the means 72 is active to fill the stack (75a), i.e., to put re-jump information on the stack (22), which is required when the sub-program, which has been called with LCALL, is terminated again. Finally, the means 72 activates the means 71 for reading in via an activation line 71a, to access the physical address in the same physical memory window, which has been identified by the logical address by step 21 of FIG. 2A and the currently prevailing descriptor (23).

Figure 2B:
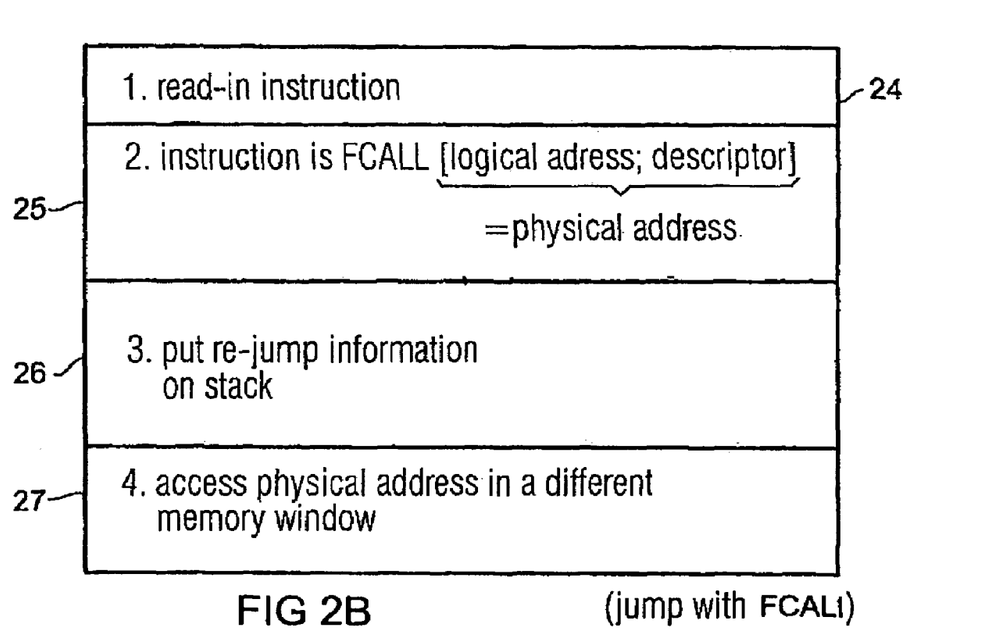
FIG. 2B is a flow sequence at a jump with FCALL.

In a similar manner, an instruction FCALL is processed, as it can be seen in FIG. 2B. First, an instruction is read in by the means 71 of FIG. 7 (24). Then, the means 72 for examining determines that the instruction is an instruction FCALL. As argument, the instruction FCALL comprises the logical address as well as a descriptor, which together define a physical address, which is in all probability in a different one than the currently prevailing memory window.

As it has been described with reference to FIG. 7, the means 72 is, in this case, further active to determine re-jump information and put it on the stack (26). The re-jump information ensures that after processing the sub-program, which has been called with FCALL, the program, from which the sub-program has been called, can be continued correctly.

After filling the stack (75a in FIG. 7), the means 71 for reading-in is activated again over the line 71a, to access (27) the physical address in a different memory window determined by the descriptor obtained in step 25.

In a preferred embodiment of the present invention, the means 71 for reading-in comprises a MMU (memory management unit), in which a descriptor field is updated by the descriptor obtained from the instruction FCALL (step 25), to change the visible physical memory window respectively.

Figure 3:
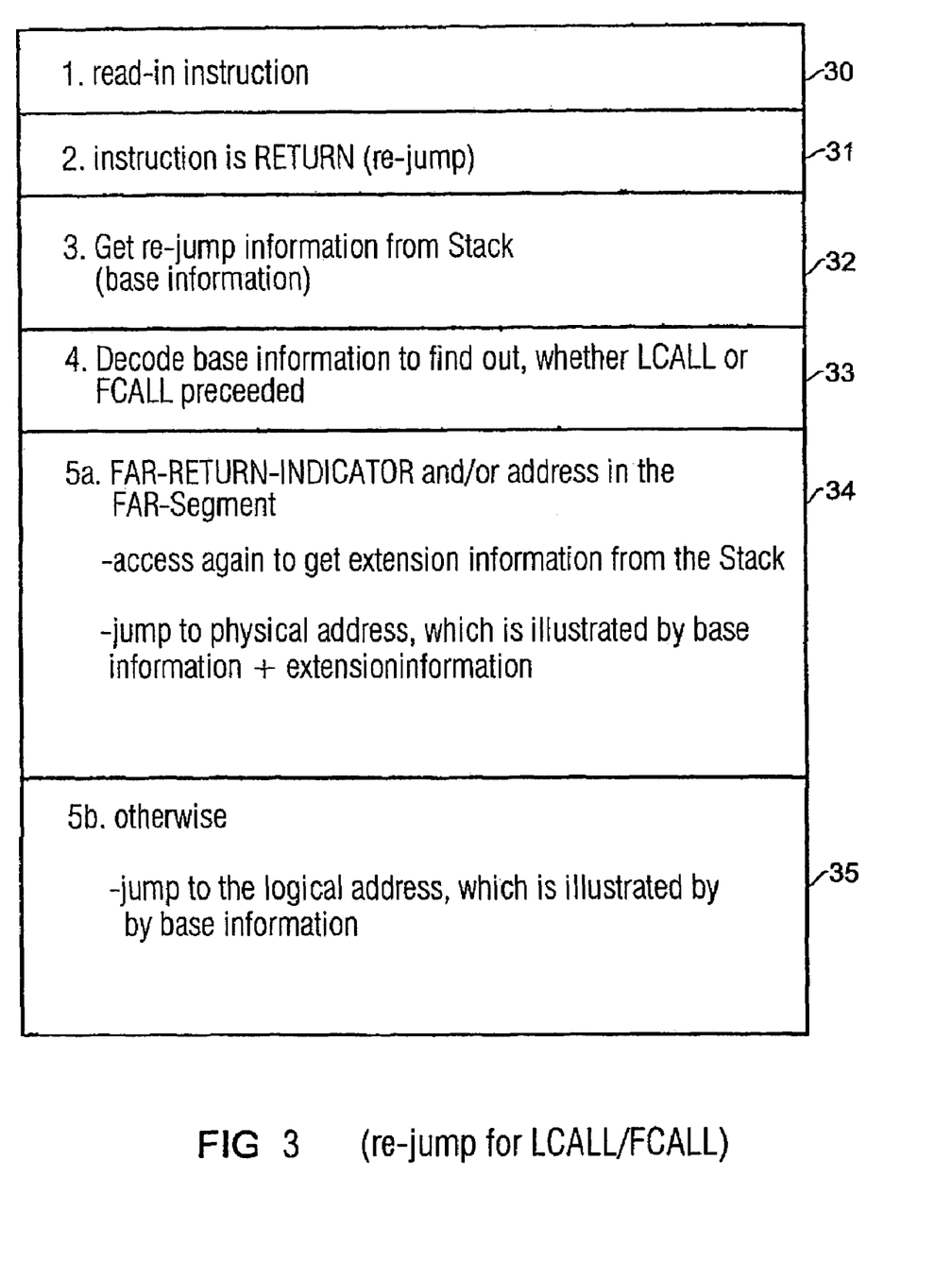
FIG. 3 is a flow diagram for a re-jump.

FIG. 3 shows a flow sequence of the apparatus shown in FIG. 7, with an emphasis on the case where the means 72 determines that a re-jump instruction (return) has been read in. First, an instruction is read in again by the means 71 (30). Then, the means 72 for examining determines that the instruction is a re-jump instruction (31). Thereupon, the line 75b is activated to obtain re-jump information from the memory 74 (32). Particularly, a predetermined amount of re-jump information, which is also referred to as base information, is fetched, independent of the fact whether a first or second jump instruction has preceded the re-jump instruction. This ensures that no internal interventions are required in an existing microprocessor architecture. In such an architecture, the processor is formed to fetch a predetermined amount of information from the stack, every time when a re-jump is detected. In a processor, which has addresses with a length of 16 bits (2 bytes), which means a processor, which can address a memory of 64 kbytes and a logical address space of 64 kBytes, respectively, these are 16 bits and 2 bytes, respectively. Therefore, these 2 bytes are always taken from the stack in step 32.

In a step 33, the means 73 for decoding the base information is activated, to find out, generally, whether a call with LCALL or with FCALL has preceded. Particularly, the base information is decoded to find out whether further information is to be taken from the stack or not. It should be noted that the stack is not able to signalize actively, how much information belongs to a re-jump. This is due to the existing processor architecture, since always only 2 bytes are required there as re-jump information, namely the logical address, with which the processor further processes the sequence of instructions after the re-jump. The stack itself is not able to inform the means for examining referenced with 76 in FIG. 7, how much re-jump information, i.e., how many bytes, is to be taken from the stack.

As it will be illustrated in more detail below, the 2 bytes, which the means for examining calls according to standard, contain in the case of a FCALL instruction and sometimes also in the case of a LCALL instruction a hint that for the correct determination of the re-jump address more information than the base information is required.

Particularly, means 73 for decoding is formed to find a Far return indicator, i.e., the window change indicator in the base information in a first preferred embodiment. In another embodiment, the base information presents a logical address, which, when it is present in the Far segment (FIG. 6B), indicates the means 73 for decoding that extension information is required. If the means 73 for decoding determines something in that way, it accesses the memory 74 again, to get so-called extension information from the stack, which then—together with the base information—result in the correct physical address, to which a jump has to be made (71 of FIG. 7) for reading-in the next instruction of the sequence.

If the means 73 for decoding determines that the base information do not comprise such indices, a jump is made to the logical address, which is illustrated by the base information, as it is shown in FIG. 3 at 35. No memory window change takes place, i.e., no reconfiguration of the MMU with a new descriptor or anything in that way has to take place.

In the following, with reference to FIGS. 4 and 5, two preferred embodiments of the present invention are illustrated in more detail, which refer to the scenario illustrated in FIG. 6B, where the logical address base is divided in non-Far segments 60 and a Far segment 62. According to specifications, the descriptors 1, 2 and 3 are fixed, i.e., the respective 16 kbyte memory windows are always fixed. In order to be able to access the whole physical address space, the descriptor 4 of the Far segment 62 is variable, as it is illustrated by an arrow 63. By changing the descriptor 4 to an arbitrary base address of the 16 kByte memory window associated to the descriptor, any physical address in the physical address space can be accessed. In the first embodiment (embodiment A) illustrated in FIG. 4, the re-jump information contains a so-called Far return indicator and a window change indicator, respectively, when a window change is concerned. The Far return indicator has a length of 1 byte and corresponds to a logical address space of 256 bytes. This logical address space of 256 bytes is reserved in such that no code re-jumps can take place to this area. Particularly, the Far return indicator is the high address byte of the 256 reserved bytes.

Apart from the Far return indicator, in the case of the second jump instruction FCALL, the following further re-jump information is generated and put on the stack. On the one hand the MMU base address or bank number and the descriptor information, which means, with reference to FIG. 6B, the descriptor 4. Finally, further 2 bytes follow, which the logical address indicates within the 16 kByte memory window indicated by the descriptor 4. Thus, the re-jump information is 4 byte and corresponds to the case 80 of FIG. 8. After writing the re-jump information on the stack, the stack represents itself as it is indicated at 80 in FIG. 8. On top of the stack, there is the Far return indicator (1 byte), below is the descriptor for the Far segment 62 (FIG. 6). Again below that are 2 bytes, namely byte 1 and byte 2, which together represent the logical address in the memory window designated by the descriptor.

In the following, with reference to FIG. 4, the plurality of possibilities when using the jump instructions LCALL and FCALL is illustrated in a tabular way. Depending on starting point and target point of the jump there are eight possibilities all in all, which will be discussed below. In row 40 of FIG. 4, a jump without window change from a non-Far segment into a non-Far segment is illustrated. This would be, for example, a jump from the logical address segment indicated by the descriptor 1 into a segment of the logical address space indicated by the descriptor 2. Here, no memory reconfiguration takes place, so that 2 bytes suffice as re-jump information, which represent the logical address, to which a re-jump has to be made, to continue to process the sequence of instructions. These 2 bytes correspond the predetermined amount of re-jump information and the base information, respectively, and are illustrated at 81 in FIG. 8.

In row 41, a jump with LCALL from the Far segment 62 to one of the non-Far segments 60 is illustrated. Here, also, no window change is required, so that also 2 bytes suffice as re-jump information. The same holds true for the jumps in rows 42 and 43 of FIG. 4. Here, for example, a jump is made with LCALL from a non-Far segment into a Far segment, or a jump is made from a Far segment to another Far segment.

Here, it should be noted that the first jump instruction LCALL initiates per definition no descriptor change and no window change, respectively, but merely a jump within the physical memory window indicated by the descriptors 1 to 4 of FIG. 6B.

There are several possibilities for the second jump instruction FCALL as well. A first possibility is not illustrated in FIG. 4. Here, it is illustrated that a jump is made with FCALL from a non-Far segment into another non-Far segment or into the same non-Far segment. This possibility is merely theoretical, since the descriptors in non-Far segments are fixed per definition. If the instruction can still be implemented, re-jump information of 4 byte would be required. However, it is much more favorable to perform such a jump with the instruction LCALL in row 40 of FIG. 4.

Another theoretical possibility is also not illustrated, namely that a jump is made with FCALL from a Far segment into a non-Far segment. Here, also, re-jump information of 4 bytes would be required. After a jump has been made into a non-Far segment, whose descriptor is fixed by definition, this possibility is also rather theoretical, and it would be much more favorable when the instruction LCALL in row 41 would be used.

Figure 8:
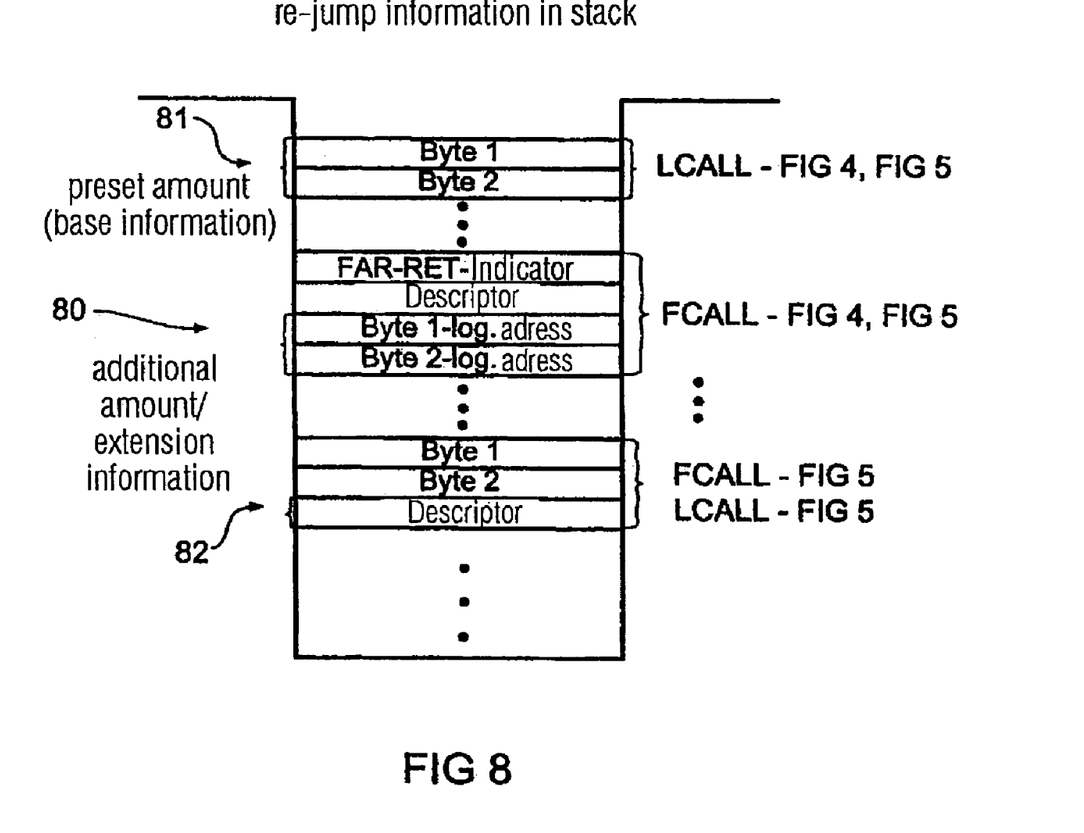
FIG. 8 is a schematical representation of a stack with different re-jump information.

If a jump is to be made with FCALL from a non-Far segment to the Far segment (row 47 of FIG. 4), the required 4 byte re-jump information, as it is indicated at 80 in FIG. 8, is required. Although the starting point is a non-Far segment, the instruction FCALL leads to a change of the descriptor 4. After a descriptor change has taken place, a descriptor restore has to be performed for the re-jump, by using the "old" descriptor stored in the re-jump information.

If a jump is made from one Far segment into another Far segment, also 4 bytes of re-jump information has to be put on the stack (row 48 of FIG. 4), to get into the "old" Far segment in a re-jump.

Figure 4:
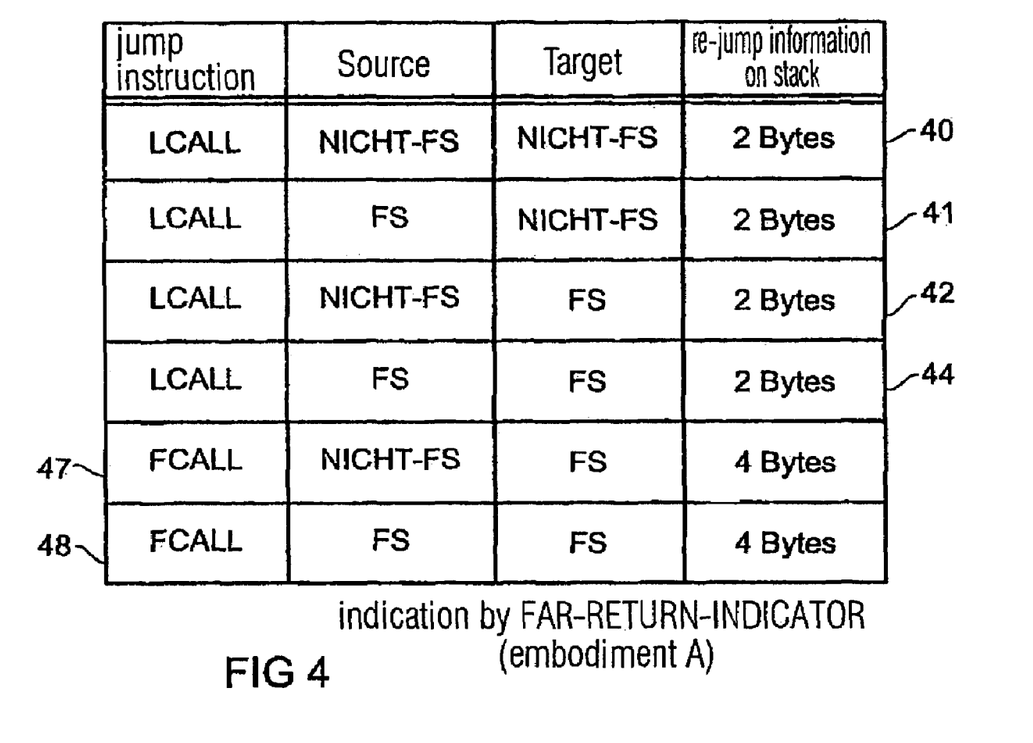
FIG. 4 is a tabular illustration of the re-jump information according to a first embodiment of the present invention.

In the embodiment shown in FIG. 4, thus, the Far return indicator explicitly indicates that a jump has been performed with FCALL and not with LCALL, since in a jump with LCALL never a Far return indicator is taken up in the re-jump information.

Significant features of the embodiment shown in FIG. 4 are that jumps within a bank and within the non-Far segments, respectively, are always performed with LCALL, and that for every jump with LCALL only 2 bytes are required. In the source code, a difference is made between FCALL and LCALL, which means that there is still a consideration of the issue in memory banks and memory windows, respectively.

It is further an advantage of the embodiment shown in FIG. 4, that full mass compatibility is provided with regard to the stack consumption, namely in that for a re-jump either 2 bytes or 4 bytes, which means 2 times 2 bytes, are required.

Still, in the embodiment shown in FIG. 4, it has to be considered that for every FCALL instruction a stack consumption of 4 bytes occurs.

In the following, an alternative embodiment will be shown with reference to FIG. 5, wherein merely for a jump with FCALL from a non-Far segment into a Far segment 4 bytes are required, while in a jump with FCALL from a Far segment into an arbitrary segment merely 3 bytes are required, in contrary to the embodiment shown in FIG. 4.

In rows 50, 51, 52, 53 of FIG. 3, the different possibilities when LCALL is used are illustrated in detail, while in rows 56 and 57 the possibilities when FCALL is used are illustrated. In the embodiment shown in FIG. 5, the means 73 for decoding as described in connection with FIG. 4, is sensitive to the Far return indicator, and the means for decoding is further sensitive to whether the upper 2 bytes of the re-jump information, which means the base information, are a logical address in the Far segment or not.

Particularly, the 3-byte re-jump information is constructed as it is shown at 82 in FIG. 8. The upper 2 bytes, byte 1 and byte 2, represent a logical address in the Far segment, while the third byte is the 8 bit descriptor for the memory window, starting from which the jump with FCALL or LCALL has been performed. For the case indicated in row 50 that a jump is made from a non-Far segment into a non-Far segment with LCALL, nothing particular results. Merely 2 bytes of re-jump information are put on the stack, which corresponds to the case 81 of FIG. 8. If, however, a jump is made with LCALL from a Far segment to a non-Far segment, the 3 bytes (case 82) of re-jump information have to be put on the stack (row 51). In a re-jump, the means for decoding will determine that the upper 2 bytes of the re-jump information represent a logical address in the Far segment of the logical address space. Thus, the means for decoding activates the means 72 for examining to access the stack again, to get a further byte.

If, however, a jump is made from a non-Far segment into a Far segment with LCALL (row 52), only 2 bytes are required, since the logical address of the re-jump information is in a non-Far segment. If, however, a jump is made with LCALL from a Far segment into a Far segment, again 3 bytes are required, since the logical address of the predetermined amount of re-jump information, which means the base information, is a logical address in the Far segment of the logical address space.

If, however, a jump is made with FCALL from a non-Far segment into a non-Far segment, 4 bytes of re-jump information are required (case 80 of FIG. 8), since the instruction FCALL can require a descriptor change, which has to be restored again. Since the logical address of the source is an address in the non-Far segment, the means 73 for decoding would take no further action merely due to the criteria described for the rows 50 to 53. Thus, further, a Far return indicator is stored as re-jump information, which signals to the means 72 for examining that not only 1 further byte but 2 further bytes have to be fetched from the memory, to "use up" all 4 bytes of re-jump information.

Figure 5:
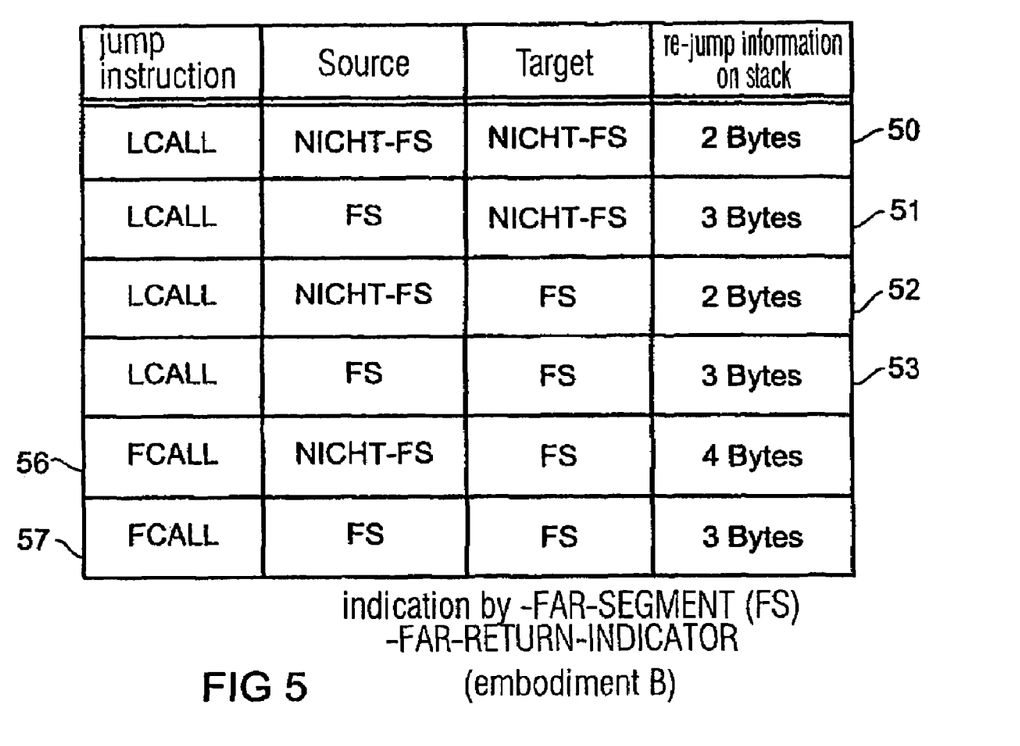
FIG. 5 is a tabular illustration of the re-jump information according to a second embodiment of the present invention.

The jump from a non-Far segment to a non-Far segment, can be performed much more favorable with the instruction LCALL in the configuration of row 50 of FIG. 5. Here, merely 2 bytes of stack are consumed.

Another more theoretical possibility is not illustrated in FIG. 5, namely that a jump is made with FCALL from a Far segment to a non-Far segment. Since, however, the descriptor of the non-Far segment is fixed by definition, but would be changed by the instruction FCALL, this possibility is not indicated in the normal case of application. There could, however, be possibilities where as an exception, a descriptor in a non-Far segment is to be changed as well. In any case, for this case an amount of 3 bytes of re-jump information will be required, which corresponds again to the case 82. In this case, the upper 2 bytes of the re-jump information are the logical address of a Far segment, which is determined by means 73 for decoding and causes it to cause the means 72 for examining to get another byte from the stack.

If, as it is illustrated in row 56 of FIG. 5, a jump is made with the instruction FCALL from a non-Far segment into a Far segment, again 4 bytes of re-jump information are required (case 80 of FIG. 8), since the logical address of the re-jump information is no address in the Far segment and the single decoding due to the Far segment indication would cause no further byte fetching from this stack. Thus, the Far return indicator is required.

For the case of a jump from a Far segment into a Far segment (row 75 of FIG. 5), again, 3 bytes are required. In the case of a re-jump, the means 73 for decoding will determine that the logical address of the source point is an address in the Far segment, so that it activates the means 72 for examining, to get a further byte from the stack, to consume all 3 bytes of the case 82 of FIG. 8.

With reference to FIG. 5, it can be seen that for a call from a Far segment, always 3 bytes of re-jump information are required, independent of the fact whether this call is performed with LCALL or FCALL, and independent of the fact whether a jump is made into the Far segment or the non-Far segment. As it is illustrated at 82, the logical address of the re-jump information is put on the stack, and the descriptor, namely the MMU base address is placed below the logical address in the stack. The differentiation whether re-jump information of 2 or 3 bytes are present, is performed by determining by means 73 for decoding, whether the upper 2 bytes of the re-jump information represent a logical address in the Far segment or not.

If a call into the Far segment with FCALL takes place, 4 bytes will be required, as it is illustrated with reference to FIG. 4. If, however, the Far segment is "entered" with LCALL, merely 2 bytes are required (row 52 of FIG. 5).

Remarkable about the embodiment shown in FIG. 5 is the fact that in the Far segment every call costs 3 bytes.

Depending on the form, the embodiment shown with reference to FIG. 4 will be more favorable or less favorable than the embodiment shown in FIG. 5. If it is intended to always use the instruction FCALL and actually the physical address space is to be addressed linearly to the, for example, 8 MB, the embodiment shown in FIG. 5 is more favorable in that no differentiation between FCALL and LCALL has to be performed, since merely the instruction FCALL has to be used. The means 73 for decoding is formed to get 3 bytes or 4 bytes from the stack in this case, depending on the scenario. The jumps with FCALL into a non-Far segment, which are possible in principle, can be performed simpler and cheaper with LCALL (row 50 and row 51 of FIG. 5). Still, the limitation to merely the usage of FCALL has the advantage that there is merely one option for the jump instruction and a differentiation between the one option and the other option has to be made no longer.

If, however, LCALL is used as often as possible, and FCALL is only used rarely, it can be seen that the embodiment shown in FIG. 4 is more favorable with reference to the stack usage.

However, all embodiments have in common that an explicit differentiation whether a jump was a jump without descriptor change (LCALL) or a jump with descriptor change (FCALL) becomes unnecessary by the inventive encoding of the re-jump information when performing a jump and by the respective decoding of the re-jump information in the respective re-jump. Further, the inventive stack encoding enables a hardware-controlled differentiation of functions called with FCALL or LCALL. This is made possible, by, like in the general case, always taking the same amount of re-jump information from the stack, but, however, in difference to the general case, not simply interpreting the predetermined amount of re-jump information as logical re-jump address, but decoding it to determine whether it has already been the total re-jump information (case 81 of FIG. 8), or if another byte is to be fetched from the stack (case 82 of FIG. 8), or if 2 further bytes are to be fetched from the stack (case 80 of FIG. 8), in order to be able to determine the correct physical address, which has to be accessed after the re-jump, to continue the performance of the sequence of instructions.

In deviation from the above-described embodiments it is also possible to use a stack with a different granularity than 1 byte. Further, it is also possible to use not one full byte as Far return indicator, but merely, for example, a single bit, which is disposed at a position within the predetermined amount of re-jump information known for the decoder, so that the decoder can examine whether further information is to be fetched from stack (when the bit is, for example, set), or whether no information is required from stack (for example, when the bit is not set).

In the sense of this application, the term "descriptor" means both the apparatus in an MMU, where a base address can be stored, and the information stored in this memory, which are sufficient for restoring this base address, such as the 8 MSBs of the base address or a pointer to a table where the information is.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for processing a sequence of instructions, which are stored at different memory addresses in a physical address space, wherein the apparatus is formed to address a logical address space by a predetermined number of logical addresses, and wherein the physical address space is larger than the logical address space, wherein a jump instruction comprises a physical address to address an instruction, which is positioned outside of a physical memory window defined, by the logical address space, and wherein a return jump instruction is provided to terminate a sub-sequence of instructions started by the jump instruction, comprising:

a reader for reading in an instruction of the sequence of instructions;

an examiner for examining the read instruction, wherein the examiner is formed to determine and store return jump information on a stack, when the examined instruction is a jump instruction, the return jump information referring to the presently current physical memory window, and to retrieve a predetermined amount of stored return jump information from a stack, when the examined instruction is a return jump instruction; and a decoder for decoding the predetermined amount of stored return jump information retrieved from the stack to determine whether the predetermined amount comprises a reference to a physical address outside of a current physical memory window, wherein the decoder is formed to activate the examiner, when the predetermined amount comprises a reference to a physical address outside of a current physical memory window, and wherein the examiner is formed to retrieve another amount of stored return jump information from the stack to identify the physical address outside of a current physical memory window for a return jump, when the examiner is activated by the decoder.

2. The apparatus according to claim 1:

wherein further another jump instruction is provided, which comprises information for a logical address, to address an instruction, which is positioned in the physical memory window defined by the logical address space;

wherein the examiner is formed to determine and store further return jump information in the case of the presence of another jump instruction, which refer to a presently current logical address space; and wherein the decoder the predetermined amount of the stored return jump information is further formed to determine whether the predetermined amount refers to a logical address in the current physical memory window which is suitable for a return jump.

3. The apparatus according to claim 2, further comprising:

a memory management unit for converting the information of the jump instruction or the further jump instruction into a physical address.

4. The apparatus according to claim 2, wherein the examiner is formed to determine a logical address as re-jump information for the further jump instruction, by using which the sequence of instructions can be continued after a return jump instruction.

5. The apparatus according to claim 3, wherein the memory management unit is formed to use a descriptor, which identifies a physical address in the physical memory window, so that a physical address can be determined by using the descriptor and a logical address in the logical address space.

6. The apparatus according to claim 5, wherein the memory management unit is formed to use at least two different descriptors for a logical address space, so that the physical memory window defined by the logical address space comprises uncontiguous physical memory areas, wherein every physical memory area is associated to a segment of the logical address space.

7. The apparatus according to claim 6, wherein one segment of the logical address space is defined as a Far segment, such that only a jump to a logical address in this segment leads to a change of the memory area by using the jump instruction.

8. The apparatus according to claim 7, wherein the decoder is formed to activate the examiner to retrieve further region information, in the case where the predetermined amount of return jump information is a logical address in the Far segment.

9. The apparatus according to claim 8, wherein the decoder is formed to further activate the examiner, when the predetermined amount comprises a window change indicator.

10. The apparatus according to claim 1:

wherein the sequence of instructions comprises a main program, wherein the main program comprises a call for calling a sub-program, and wherein a return instruction is disposed at the end of the sub-program; and wherein the call instruction can be realized by the jump instruction or the further instruction and the return instruction by the return jump instruction.

11. The apparatus according to claim 1, wherein the information about a physical address of the jump instruction comprises a logical address and a descriptor for identifying a physical memory area.

12. The apparatus according to claim 1, wherein the examiner is formed to generate a window change indicator and to add it to the return jump information for the jump instruction.

13. The apparatus according to claim 12, wherein the examiner is formed to determine a descriptor for identifying a physical memory area as well as a logical address, in addition to the window change indicator, to continue the sequence of instructions after a return jump instruction by using the logical address and the descriptor.

14. The apparatus according to claim 12, wherein the window change indicator refers to one or several predetermined addresses of the logical address space, to which no jump takes place by definition.

15. The apparatus according to claim 1, which further comprises a stack memory for storing the return jump information, wherein the stack memory is organized as last-in-first-out memory.

16. The apparatus according to claim 1, wherein the predetermined amount of the stored return jump information is equal to an amount of information, which represent a logical address in the logical address space.

17. The apparatus according to claim 1, wherein the logical address space comprises 64 kByte, wherein a logical address comprises 2 bytes, wherein the predetermined amount comprises 2 bytes, and wherein the further amount comprises 1 byte or several bytes.

18. Method for processing a sequence of instructions, which are stored at different memory addresses in a physical address space, wherein the apparatus is formed to address a logical address space by a predetermined number of logical addresses, and wherein the physical address space is larger than the logical address space, wherein a jump instruction comprises a physical address to address an instruction, which is positioned outside of a physical memory window defined by the logical address space, and wherein a return jump instruction is provided, to terminate a sub-sequence of instructions started by the jump instruction, comprising:

reading-in an instruction of the sequence of instructions;

examining the read instruction to determine and store return jump information on a stack, when the examined instruction is a jump instruction, the return jump information referring to a presently current physical memory window, retrieving a predetermined amount of stored return jump information from the stack, when the examined instruction is a return jump instruction;

decoding the predetermined amount of the stored return jump information retrieved from the stack, to determine whether the predetermined amount comprises a reference to a physical address outside of a current physical memory window; and when the predetermined amount comprises a reference to a physical address outside of a current physical memory window, retrieving a further amount of the stored return jump information from the stack to identify the physical address outside of a current physical memory window for a return jump.

19. An apparatus for processing a sequence of instructions comprising a main program, wherein the main program comprises a call for calling a sub-program, the instructions being stored at different memory addresses in a physical address space, wherein the apparatus is formed to address a logical address space by a predetermined number of logical addresses, and wherein the physical address space is larger than the logical address space, wherein a jump instruction comprises a physical address to address an instruction, which is positioned outside of a physical memory window defined by the logical address space, and wherein a return instruction is provided to terminate the sub-program, wherein a further jump instruction is provided, which comprises information for a logical address to address an instruction, which is positioned in the physical memory window defined by the logical address space, comprising:

a reader for reading in an instruction of the sequence of instructions;

an examiner for examining the instruction, wherein the examiner is formed to determine and store return information in the case of the presence of the jump instruction, the return information referring to the presently current physical memory window, wherein the examiner is formed to determine and store further return information in the case of the further jump instruction, the further return information referring to a presently current logical address space, and to retrieve a predetermined amount of the stored return information in the case of a return instruction;

a decoder for decoding the predetermined amount of stored return information to determine whether the predetermined amount comprises a reference to a physical address outside of a current physical memory window, or whether the predetermined amount refers to a logical address in the current physical memory window being suitable for a return, and to activate the examiner in such a case, to retrieve another amount of the stored return information to identify the physical address outside of a current physical memory window for return; and a memory management unit for converting the information of the jump instruction or the further jump instruction into a physical address, wherein the memory management unit is formed to use a descriptor, which identifies a physical address in the physical memory window, so that a physical address is determined by using the descriptor and a logical address in the logical address space, wherein the memory management unit is formed to use at least two different descriptors for a logical address space, so that the physical memory window defined by the logical address space comprises non-contiguous physical memory areas, wherein every physical memory area is associated to a segment of the logical address space, and wherein one segment of the logical address space is defined as a Far segment, such that only a jump to a logical address in the Far segment leads to a change of the memory area by using the jump instruction.

20. An apparatus for processing a sequence of instructions, which are stored at different memory addresses in a physical address space, wherein the apparatus is formed to address a logical address space by a predetermined number of logical addresses, and wherein the physical address space is larger than the logical address space, wherein a first jump instruction comprises a physical address to address an instruction, which is positioned outside of a physical memory window defined by the logical address space, and wherein a return jump instruction is provided to terminate a sub-sequence of instructions started by the first jump instruction, comprising:

a reader for reading in an instruction of the sequence of instructions;

an examiner for examining the read instruction, wherein the examiner is formed to determine and store return jump information on a stack, when the examined instruction is the first jump instruction, the return jump information referring to the presently current physical memory window, and to retrieve a predetermined amount of stored return jump information from a stack, when the examined instruction is a return jump instruction; and a decoder for decoding the predetermined amount of stored return jump information retrieved from the stack to determine whether the predetermined amount comprises a reference to a physical address outside of a current physical memory window, wherein the decoder is formed to activate the examiner when the predetermined amount comprises a reference to a physical address outside of a current physical memory window, and wherein the examiner is formed to retrieve another amount of stored return jump information from the stack to identify the physical address outside of a current physical memory window for a return jump, when the examiner is activated by the decoder, wherein a second jump instruction is provided, which comprises information for a logical address, which is positioned in the physical memory window defined by the logical address space, wherein the examiner is formed to determine and store second return jump information in the presence of the second jump instruction, the second return jump information referring to a current logical address space, and wherein the decoder is formed to determine, whether the predetermined amount refers to a logical address in the current physical memory window which is suitable for a return jump;

a memory management unit for converting the information of the jump instruction or the second jump instruction into a physical address, wherein the memory management unit is formed to use at least two different descriptors, identifying physical addresses in the physical memory window, a physical address being determined by using a descriptor and a logical address in the logical address space, wherein the physical memory window defined by the logical address space comprises non-contiguous physical memory areas, and wherein every physical memory area is associated to a segment of the logical address space, and
wherein one segment of the logical address space is defined as a Far segment, such that only a jump to a logical address in this segment leads to a change of the memory area by using the second jump instruction.

* * * * *